United States Patent
Lambert et al.

(10) Patent No.: US 9,807,352 B2
(45) Date of Patent: Oct. 31, 2017

(54) METHOD AND DEVICE FOR PARKING A VEHICLE

(75) Inventors: Georg Lambert, Wolfsburg (DE); Gerald Eckert, Lehrte (DE)

(73) Assignee: VOLKSWAGEN AG, Wolfsburg (DE)

(*) Notice: Subject to any disclaimer, the term of this patent is extended or adjusted under 35 U.S.C. 154(b) by 300 days.

(21) Appl. No.: 14/126,236

(22) PCT Filed: Jun. 11, 2012

(86) PCT No.: PCT/EP2012/002470
§ 371 (c)(1),
(2), (4) Date: Dec. 13, 2013

(87) PCT Pub. No.: WO2013/000538
PCT Pub. Date: Jan. 3, 2013

(65) Prior Publication Data
US 2014/0139677 A1 May 22, 2014

(30) Foreign Application Priority Data
Jun. 28, 2011 (DE) .................. 10 2011 105 884

(51) Int. Cl.
*H04N 7/00* (2011.01)
*H04N 7/18* (2006.01)
(Continued)

(52) U.S. Cl.
CPC ............. *H04N 7/183* (2013.01); *B60K 35/00* (2013.01); *B62D 15/0275* (2013.01);
(Continued)

(58) Field of Classification Search
CPC .... H04N 7/183; B62D 15/0275; B60W 50/14
(Continued)

(56) References Cited

U.S. PATENT DOCUMENTS

| | | | |
|---|---|---|---|
| 2003/0080877 A1* | 5/2003 | Takagi | B60R 1/00 340/932.2 |
| 2004/0130464 A1* | 7/2004 | Schindler | B60Q 9/005 340/932.2 |

(Continued)

FOREIGN PATENT DOCUMENTS

| | | |
|---|---|---|
| CN | 1371079 A | 9/2002 |
| CN | 101175972 A | 5/2008 |

(Continued)

OTHER PUBLICATIONS

Search Report for German Patent Application No. 10 2011 105 844.6; dated May 24, 2012.
(Continued)

*Primary Examiner* — Jeffery Williams
(74) *Attorney, Agent, or Firm* — Barnes & Thornburg LLP

(57) ABSTRACT

A method for assisting a reverse parking maneuver of a motor vehicle equipped with a rear-view camera system into a longitudinal parking space, wherein the image of the surroundings to the rear of the motor vehicle is displayed on a display of the motor vehicle. For the determination of the parking position on both sides of the vehicle, two 3D symbols, in particular 3D cuboids, are respectively blended into the image of the rear-view camera system, wherein the distance between two 3D symbols corresponds to one side of a minimum parking space for the motor vehicle.

17 Claims, 16 Drawing Sheets

(51) Int. Cl.
  *B60K 35/00* (2006.01)
  *B62D 15/02* (2006.01)
  *B60W 50/14* (2012.01)

(52) U.S. Cl.
  CPC .. *B62D 15/0295* (2013.01); *B60K 2350/1088* (2013.01); *B60W 50/14* (2013.01)

(58) Field of Classification Search
  USPC .......................................................... 348/148
  See application file for complete search history.

(56) References Cited

U.S. PATENT DOCUMENTS

| | | | |
|---|---|---|---|
| 2006/0022810 A1 | 2/2006 | Inoue et al. | |
| 2009/0243888 A1* | 10/2009 | Kawabata | G08G 1/166 340/932.2 |
| 2010/0045448 A1* | 2/2010 | Kakinami | B60R 1/00 340/435 |
| 2010/0265048 A1* | 10/2010 | Lu | B60Q 9/005 340/435 |
| 2011/0069169 A1* | 3/2011 | Kadowaki | B60R 1/00 348/148 |
| 2011/0181441 A1* | 7/2011 | Ma | B60R 1/00 340/932.2 |

FOREIGN PATENT DOCUMENTS

| | | |
|---|---|---|
| CN | 201534522 U | 7/2010 |
| CN | 101982348 A | 3/2011 |
| CN | 102055956 A | 5/2011 |
| DE | 102004047481 A1 | 4/2006 |
| DE | 102008057670 A1 | 9/2009 |
| EP | 1231110 A2 | 8/2002 |
| EP | 1253065 A2 | 10/2002 |
| EP | 1288072 A2 | 3/2003 |
| EP | 1502815 A1 | 2/2005 |
| EP | 1642768 A1 | 4/2006 |
| EP | 2246231 A1 | 11/2010 |
| EP | 2253527 A2 | 11/2010 |
| JP | 2003063340 A | 3/2003 |
| JP | 2004009959 A | 1/2004 |
| JP | 2004147083 A | 5/2004 |
| JP | 2005045602 A | 2/2005 |
| JP | 2010028432 A | 2/2010 |
| WO | 2006122870 A1 | 11/2006 |
| WO | 2009036176 A1 | 3/2009 |

OTHER PUBLICATIONS

Search Report for International Patent Application No. PCT/EP2012/002470; dated Apr. 17, 2013.
Supplementary Search report in Chinese Patent Application 201280032215.0; dated Feb. 26, 2016.
Office Action for Chinese Patent Application; dated Jul. 13, 2015.

* cited by examiner

METHOD AND DEVICE FOR PARKING A VEHICLE

PRIORITY CLAIM

This patent application is a U.S. National Phase of International Patent Application No. PCT/EP2012/002470, filed 11 Jun. 2012, which claims priority to German Patent Application No. 10 2011 105 884.6, filed 28 Jun. 2011, the disclosures of which are incorporated herein by reference in their entirety.

SUMMARY

The present disclosure relates to a method and a device for parking a motor vehicle provided with a rear-view camera system.

BRIEF DESCRIPTION OF THE DRAWINGS

Illustrative embodiments are explained below by means of the drawings, in which.

DETAILED DESCRIPTION OF THE DISCLOSED EMBODIMENTS

Figure 1:
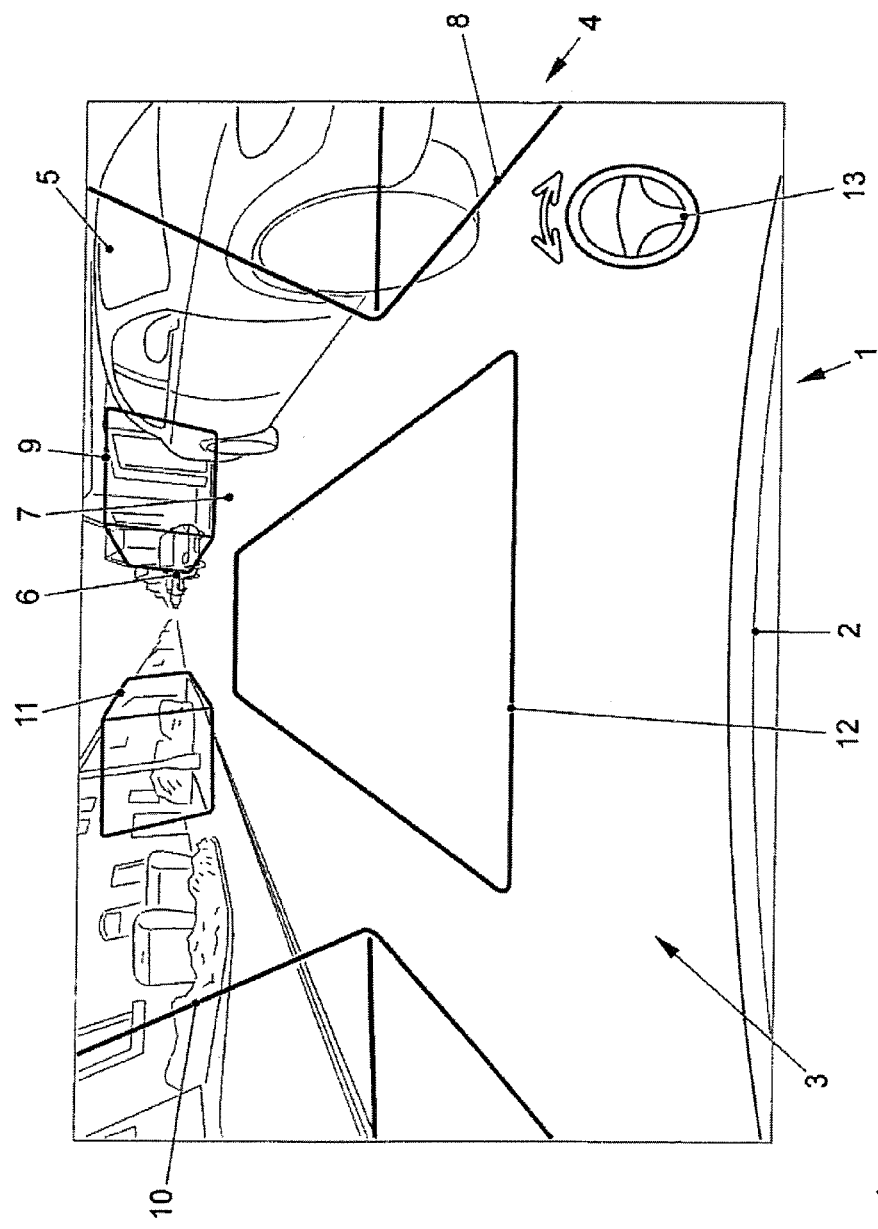
FIG. 1 shows the reversing into a parking position from the point of view of the rear-view camera.

Illustrative embodiments provide a method and a device for parking a motor vehicle in a parking space, which method assists the driver of the motor vehicle in parking in a parking space in a simple and clear way.

In the method for assisting a reverse parking process of a motor vehicle equipped with a rear-view camera system into a longitudinal parking space, wherein the image of the surroundings to the rear of the motor vehicle is displayed on a display of the motor vehicle, to determine the parking position on both sides of the vehicle, two first 3D symbols, in particular 3D cuboids, are respectively blended into the image of the rear-view camera system, wherein the distance between two 3D symbols corresponds to one side of a minimum parking space for the motor vehicle. In this context, a rear-view camera system comprises at least one rear-view camera which is usually provided with a wide angle lens to be able to capture a maximum area of the surroundings to the rear. Distortion suppression is, where appropriate, performed on the original image for the purpose of displaying, i.e. on a display. In addition, the minimum parking space is understood to be a parking space which is sufficiently large for the motor vehicle which is to be parked to park in the space by reversing in a single maneuver. In other words, the minimum parking space is the parking space which is at least necessary to park a vehicle in the parking space without changing direction, that is to say without changing between forward and reverse movements of the vehicle. Consequently, the minimum parking space is, in particular, a function of the size, i.e. of the length and width, of the motor vehicle to be parked, wherein suitable safety distances are to be taken into account at the front and the rear.

Selecting one side for the parking process causes, the first 3D symbols of the other side of the vehicle may be faded out. In other words, if the driver of the motor vehicle activates, for example, the flashing indicator light to signal on which side of the carriageway the parking process is to be carried out, this causes the 3D signals on the other side of the carriageway to be faded out. Instead of the flashing indicator light, a corresponding direction button on the display, which is touch-sensitive in this case, could also be provided.

To determine the initial position the motor vehicle may be moved until the gap between the first 3D symbols corresponds to the longitudinal parking space. If, therefore, for example the real parking space is defined by two parked vehicles and the first 3D symbols are formed by schematic 3D cubes, the motor vehicle is moved back until the 3D cube which is at the front with respect to the motor vehicle which is being parked is substantially flush with the rear of the front parked vehicle. This state defines the searched-for initial position for parking the motor vehicle.

After the determination of the initial position in the status of the motor vehicle, a parking frame which may be blended into the image of the area to the rear of the vehicle is displaced by orienting the inward steering angle until the parking frame is oriented in the longitudinal parking space, as a result of which a deflection point is defined in the oriented parking frame. This is done by activating the steering wheel. If the motor vehicle is in the initial position, a parking frame is blended into the current image of the area to the rear of the vehicle in a first color, for example red. Turning the steering wheel brings about a change in the possible inward steering angle and leads to a displacement of the parking frame in the direction of the real parking space which can be seen in the image. If the activation of the steering wheel sets a steering angle with which it is possible to park in the parking space, the parking frame is arranged in the parking space and the parking frame is then displayed in a second color, for example green. The color change indicates immediately to the driver that the vehicle can be parked in the parking space starting from the initial position with the determined steering angle, i.e. the parking frame within the parking space defines an end position for a first reverse driving movement, referred to as the deflection point, as a result of which it is possible to estimate the driving path. A setpoint driving path is therefore defined by the selected steering angle, which is also referred to as a setpoint steering angle. The setpoint driving path may be displayed as an auxiliary line in the image of the area to the rear of the vehicle, for example as a red line.

Optionally, after the orientation of the parking frame in the longitudinal parking space rearward travel is carried out with the selected inward steering angle, i.e. the setpoint steering angle, from the initial position to the deflection point arranged in the parking frame, wherein the actual driving tube is displayed in the image of the area to the rear of the vehicle by means of two blended-in second 3D symbols, in particular 3D guide rails. If the driver does not change the setpoint steering angle, i.e. the setpoint steering angle corresponds to the actual steering angle, the setpoint driving path is congruent with the actual driving tube which is displayed by the second 3D symbols. This can be visualized, for example, in the following way. The setpoint driving path of the movement section under consideration will be assumed, for example, to be displayed by a red auxiliary line in the image of the area to the rear of the vehicle. This red auxiliary line is visible whenever the actual steering angle, displayed by the driving tube by means of the second 3D symbols, differs from the setpoint steering angle. However, if the setpoint driving path and the actual driving path correspond, the blended-in auxiliary line is congruent with the second 3D symbols, i.e. the 3D guide rails, and can no longer be seen. In this case, the driving tube basically shows the path of the vehicle as a function of the current steering angle. The display of the driving tube therefore changes directly in accordance with the steering lock.

The driver of the vehicle may stop within a predefined area surrounding the deflection point or at the deflection point, and an auxiliary line, which the driver needs to make correspond to a boundary line of the longitudinal parking space by further travel, is blended into the image of the area to the rear of the vehicle. In other words, just before or at the estimated deflection point, the driver is requested, for example by an acoustic signal and/or a stop sign displayed on the display device, to stop the vehicle and to orient an auxiliary line. If congruence is achieved, the driver stops the vehicle, as a result of which the deflection point is reached and the end point of the next driving section is defined.

To reach the end point of the vehicle movement which now follows, the driving tube, displayed by the blended-in second 3D symbols, is to be made to correspond to an auxiliary line defining the setpoint driving path of the next driving section, by selecting a new setpoint steering angle. As a result of the parking frame, described in conjunction with FIG. 5, being arranged within the parking space, the system can estimate the deflection point on the basis of the parking position. The end position of the second driving section is defined, and the ultimate deflection point specified, by orienting the auxiliary line on a longitudinal parking space boundary. The deflection point is reached by stopping the vehicle, and the estimated setpoint driving path for the second driving section between the deflection point and the end position is blended in, with the result that the driver can determine the new setpoint steering angle by making the auxiliary line of the setpoint driving path congruent with the 3D guide rails.

To assist the driver further auxiliary lines may be blended into the image of the area to the rear of the vehicle. These further auxiliary lines can be, for example, blended-in distance grids by means of which the position of the motor vehicle with respect to a parked vehicle which bounds the parking space to the rear and the orientation of the motor vehicle in the parking space are signaled to the driver.

A device for carrying out the method for parking a motor vehicle in a longitudinal parking space which comprises a rear-view camera system and a display for displaying the image of the surroundings to the rear of the motor vehicle taken by the rear-view camera system also has an apparatus for generating and blending first 3D symbols into the image of the surroundings to the rear of the motor vehicle displayed on the display to determine the parking position, wherein on each side of the vehicle two 3D symbols are displayed, the distance between which symbols corresponds to the minimum parking space for the motor vehicle. In particular, 3D cuboids are possible as first 3D symbols, the 3D cuboids being blended, for example as outlines with transparent side faces in a predefined color, into the image of the surroundings to the rear, i.e. the longitudinal parking space situation. Each side of the vehicle means in this case on the traffic lane or parking lane located to the side of the motor vehicle.

The device for parking in longitudinal parking spaces may have an apparatus for generating and blending a parking frame into the image of the surroundings to the rear, wherein, in the identified parking position of the motor vehicle, the parking frame is displaced into the identified longitudinal parking space as a function of the steering angle, as a result of which a temporary deflection point is defined in the displaced parking frame.

The device for parking in longitudinal parking spaces may also have an apparatus for generating and blending second 3D symbols into the image of the surroundings to the rear of the motor vehicle, wherein the second 3D symbols display or symbolize the driving tube of the motor vehicle during the parking process.

In particular, the device for parking in longitudinal parking spaces can have an apparatus for generating and blending further auxiliary lines into the image of the surroundings to the rear of the motor vehicle to assist the driver during the parking process.

The device may have an estimating unit for estimating the driving path expected to be travelled along. By means of this estimating unit, the expected driving path of the motor vehicle can be estimated during the steps of the parking process, that is to say for example the driving path between the parking position and the deflection position and the driving path between the deflection position and the end position.

In a second illustrative embodiment of the method for assisting a reverse parking process of a motor vehicle equipped with a rear-view camera system into a lateral parking space, wherein the image of the surroundings to the rear of the motor vehicle is displayed on a display device of the motor vehicle, during the reverse parking process the driving tube which is determined by the steering angle is displayed by two 3D symbols, in particular 3D guide rails, blended into the image of the surroundings to the rear of the motor vehicle. By visualizing the driving tube, by means of, for example, the specified 3D guide rails, the reverse parking process into a lateral parking space is easily symbolically displayed in real time in the image of the area to the rear to the driver of the motor vehicle, as a result of which possible collision risks can be detected early. In this context, the blended-in driving tube is directly dependent on the current steering angle.

In addition to the 3D symbols, a distance grid may be blended into the image of the surroundings to the rear of the motor vehicle, i.e. the lateral parking space situation to the rear, which assists the driver in orienting the motor vehicle.

A device for carrying out the method for parking a motor vehicle in a lateral parking space which comprises a rear-view camera system and a display for displaying the image of the surroundings to the rear of the motor vehicle taken by the rear-view camera system, has an apparatus for generating and blending 3D symbols into the image of the surroundings to the rear of the motor vehicle, wherein the 3D symbols display the driving tube of the motor vehicle during the parking process. As 3D symbols, optionally 3D guide rail symbols are also used here.

In addition, the device for parking in lateral parking spaces can have an apparatus for generating and blending further auxiliary lines into the image of the surroundings to the rear of the motor vehicle to assist the driver during the parking process.

FIG. 1 shows a typical situation of reverse parking into a longitudinal parking space. On a display 1, the image of a rear-view camera (not illustrated) can be seen, wherein the rear end 2 of the vehicle to be parked is displayed on the display 1 to give the driver a sensation of the actual conditions. In the image of the area to the rear, the carriageway 3 can be seen in real time, wherein on the driver's side there is a parking lane 4 on which a first vehicle 5 and a second vehicle 6 are located. Between the first and second vehicles 5, 6 a longitudinal parking space 7 can be seen. Cuboids 8, 9, 10 and 11 are blended as first 3D symbols into the image of the area to the rear, on both sides of the vehicle to be parked, wherein the distance between the cuboids of one side of the vehicle, that is to say the distance between the cuboids 8 and 9 and between the cuboids 10 and 11, corresponds to the necessary minimum length of a longitudinal parking space for the vehicle to be parked. In addition, in the image of the area to the rear a parking frame 12, which represents the minimum longitudinal parking space for the motor vehicle to be parked, is blended in. The objects blended into the image of the area to the rear, specifically the cuboids 8, 9, 10, 11 and the parking frame 12, are arranged in a spatially fixed fashion in the coordinate system of the vehicle to be parked. In addition, the blended-in objects 8, 9, 10, 11 and 12 are transparent, to avoid covering the real objects, and are configured in a suitably colored fashion, for example the parking frame can be kept in red, while the cuboids 8, 9, 10, 11 are configured in a yellow color. In particular, only the edges of the cuboids 8, 9, 10, 11 and the circumference of the parking frame 12 are configured as unbroken lines, while the cuboid areas are represented as a colored transparency. In addition, a first steering symbol 13 composed of a schematic steering wheel rim with an arrow symbol on both sides is blended in for the information of the driver in the right-hand lower region of the display 1. The arrow symbol on both sides of the first steering symbol 13 is intended to indicate to the driver that he can move the steering wheel in both directions to reach a suitable parking position.

Figure 2:
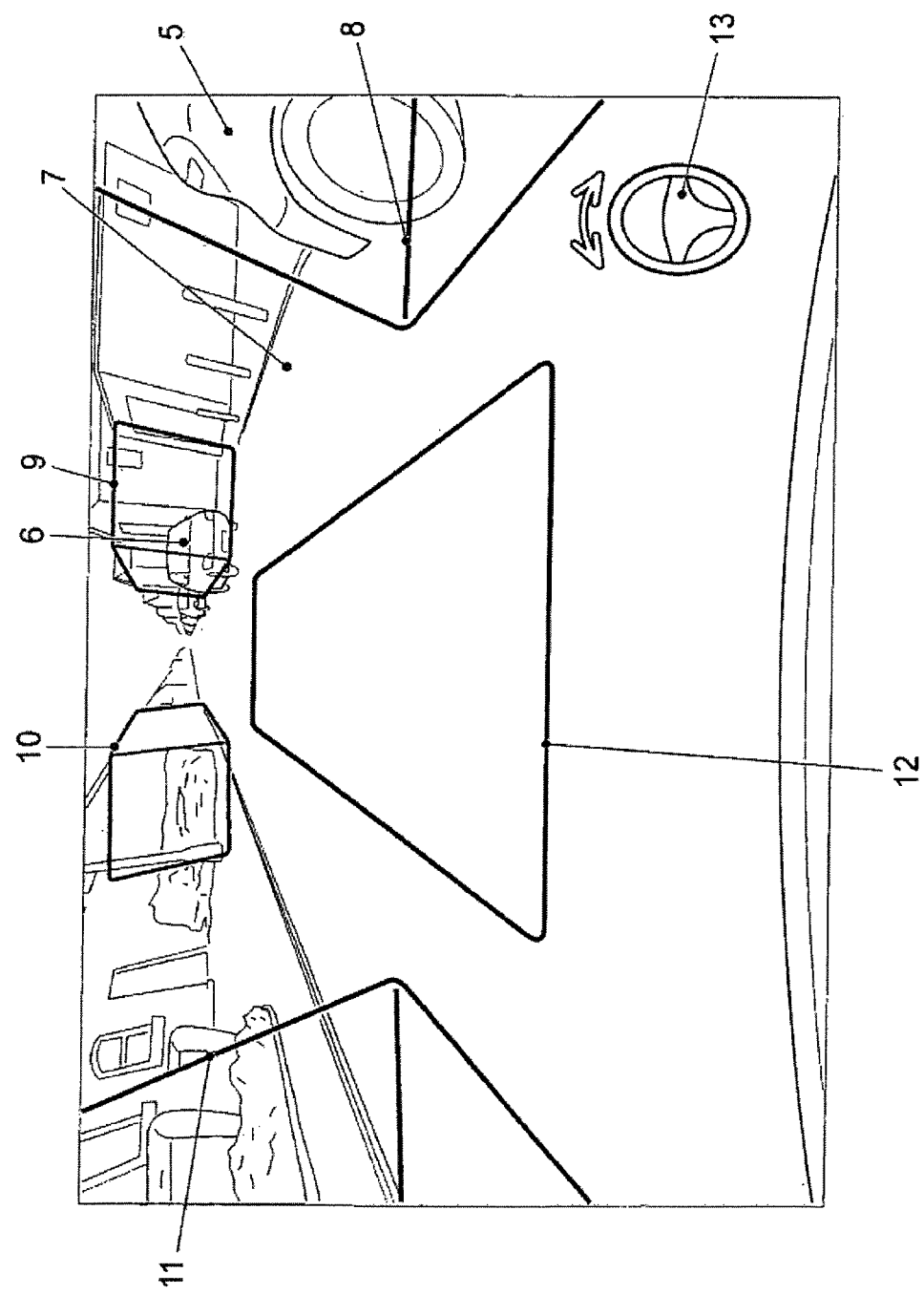
FIG. 2 shows the motor vehicle at the parking position.

FIG. 2 shows the image of the area to the rear in the display 1 after the driver of the motor vehicle to be parked has moved back further a certain amount. The cuboid 8 on the driver's side is then essentially flush with the rear of the front parked vehicle 5. Furthermore, the second cuboid 9 on the driver's side is arranged over the second parked vehicle 6, with the result that the parking space 7 is enclosed by the two blended-in cuboids 8, 9. The two cuboids 10, 11 on the front seat passenger's side and the parking frame 12 have also moved synchronously with the reverse travel.

Figure 3:
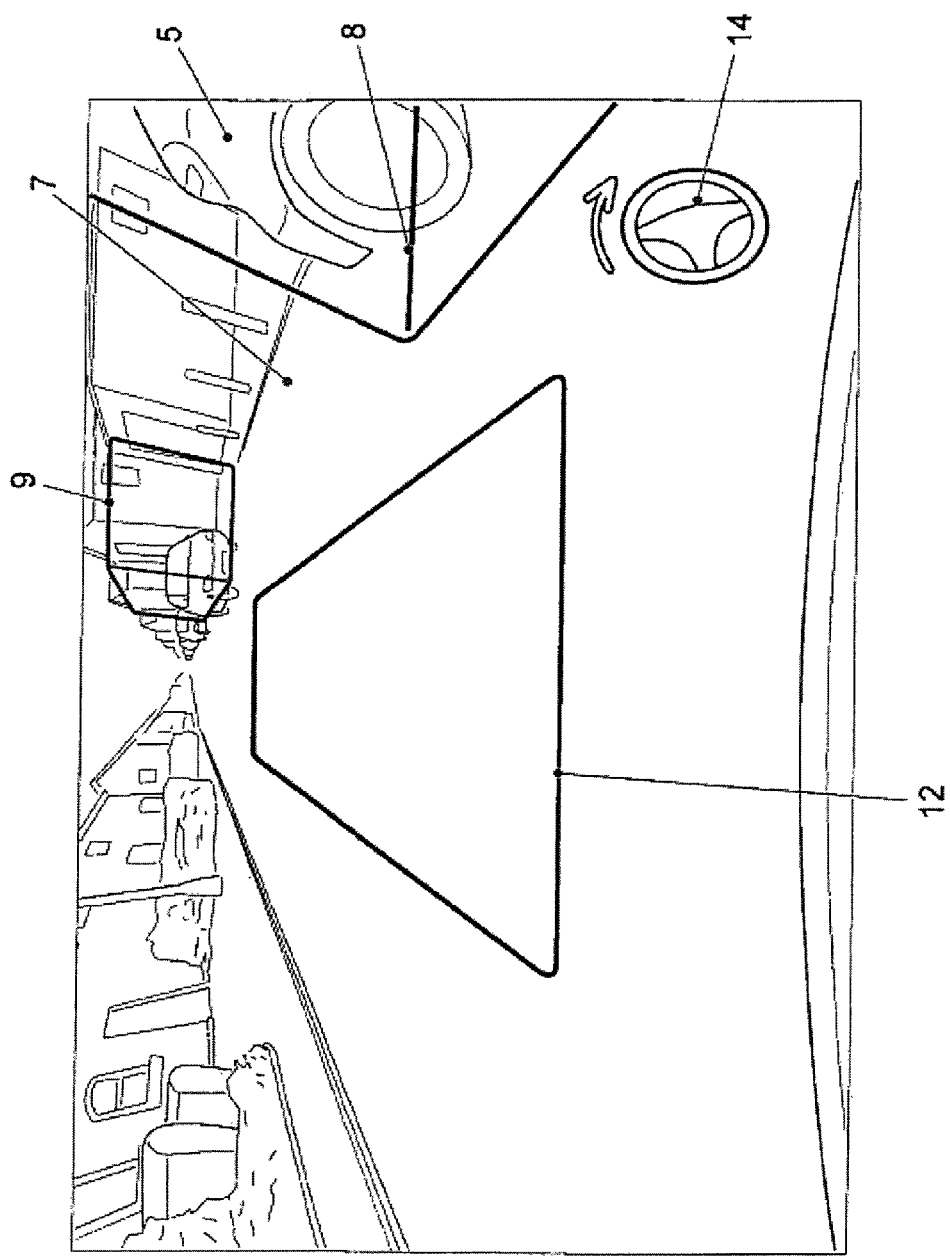
FIG. 3 shows the motor vehicle at the parking position with the selected parking side.

FIG. 3 shows the state after the activation of the flashing indicator light, as a result of which it is signaled to the system that parking is to take place on the driver's side. Since the parking side is then known, the cuboids 10, 11 on the front seat passenger's side are faded out and a second steering symbol 14 is blended in, the second steering symbol 14 instructing the driver, with an arrow symbol on one side, to change or set the steering angle in the stationary vehicle state to be able to steer into the parking space 7.

Figure 4:
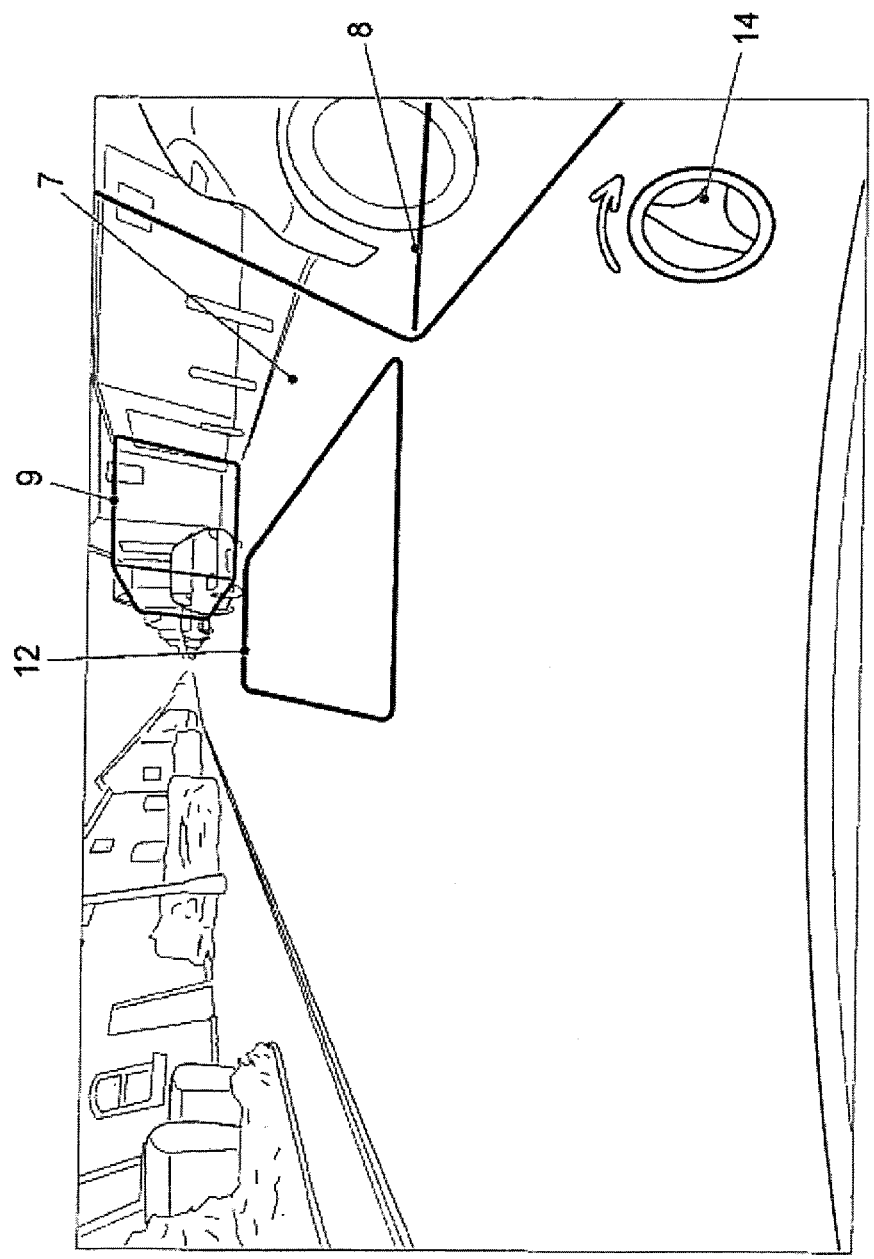
FIG. 4 shows an intermediate state during the determination of the parking angle.

FIG. 4 illustrates that the activation of the steering wheel and the steering angle which is changed therewith brings about a displacement of the parking frame 12 in the direction of the parking space 7. Consequently, a steering angle which is set by the driver at a particular time and which would have the effect of moving the vehicle to be parked during reversing out of the parking position into the parking frame illustrated in FIG. 4 is displayed. It is therefore apparent to the driver that the current steering angle does not reach the longitudinal parking space.

Figure 5:
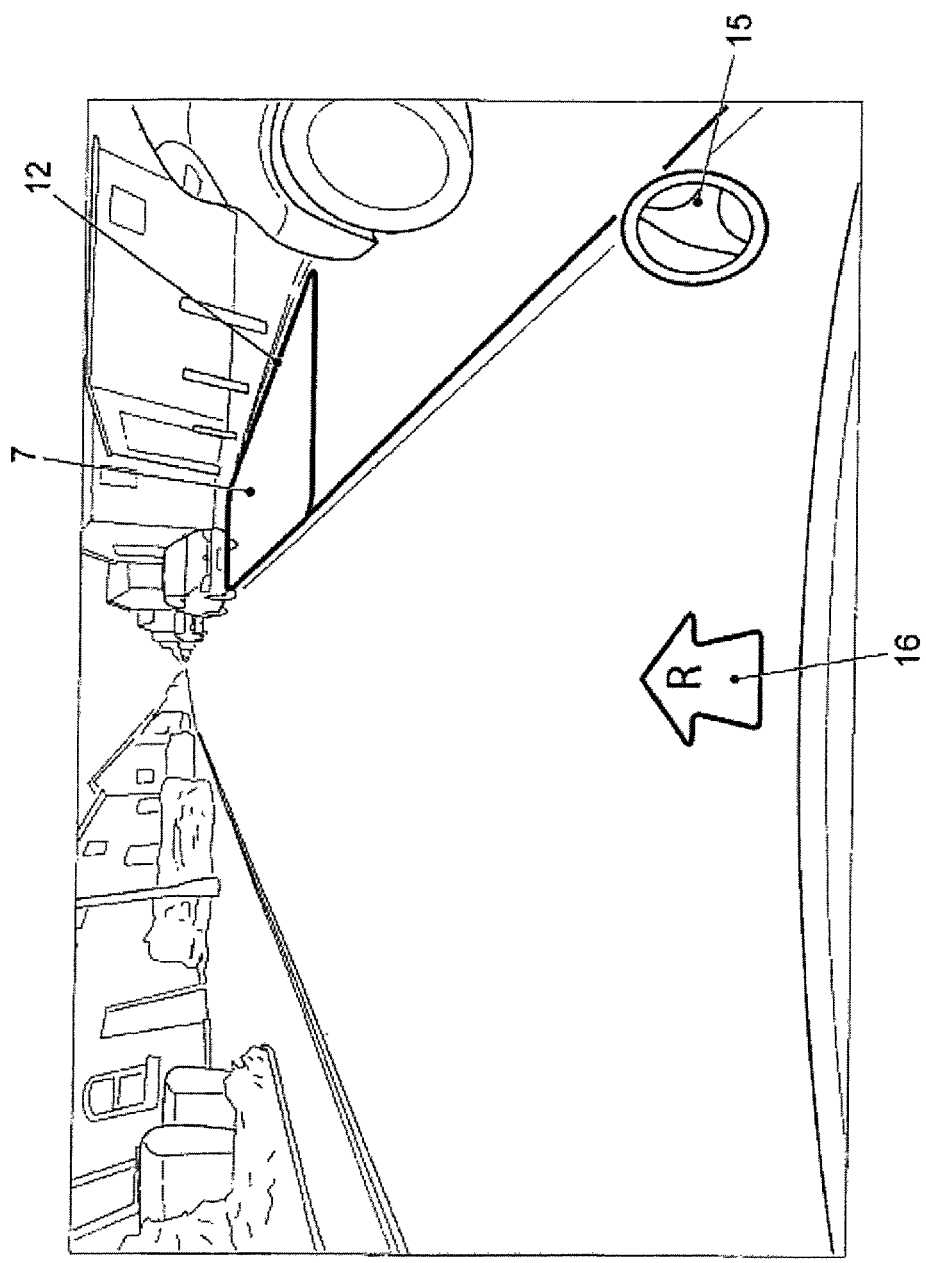
FIG. 5 shows the parking frame in the parking space with a deflection point.

FIG. 5 illustrates the situation in which the steering angle which is set by the driver is such that the parking frame 12 is moved in the longitudinal parking space 7. In other words, the parking frame 12 is arranged or fitted in the region between the cuboids 8, 9 on the driver's side in FIG. 4. If this is the case, the display color of the parking frame 12 changes, for example from red to green, as a result of which it is signaled to the driver that the selected steering angle is appropriate for the parking process. This steering angle is referred to as the setpoint steering angle of the first driving section. In addition, the cuboids 8, 9 on the driver's side which are now no longer required are faded out since now a permissible parking position has been found. Since the parking frame 12 is arranged in the longitudinal parking space 7 and can be reached on the basis of the setpoint steering angle, as a result, in addition to the parking position, a deflection point (not illustrated) which is arranged in the parking frame and at which the steering angle has to be changed again to park and orient the vehicle in the longitudinal parking space 7 is defined. As a result, the system has an estimate of the first parking position—deflection point driving path. A new steering symbol 15 without an arrow symbol is blended in, the steering symbol 15 signaling to the driver that he no longer has to carry out any further rotation of the steering wheel. Finally, a driving symbol 16 indicates to the driver that he should now reverse to arrive at the parking position defined by the parking frame 12.

Figure 6:
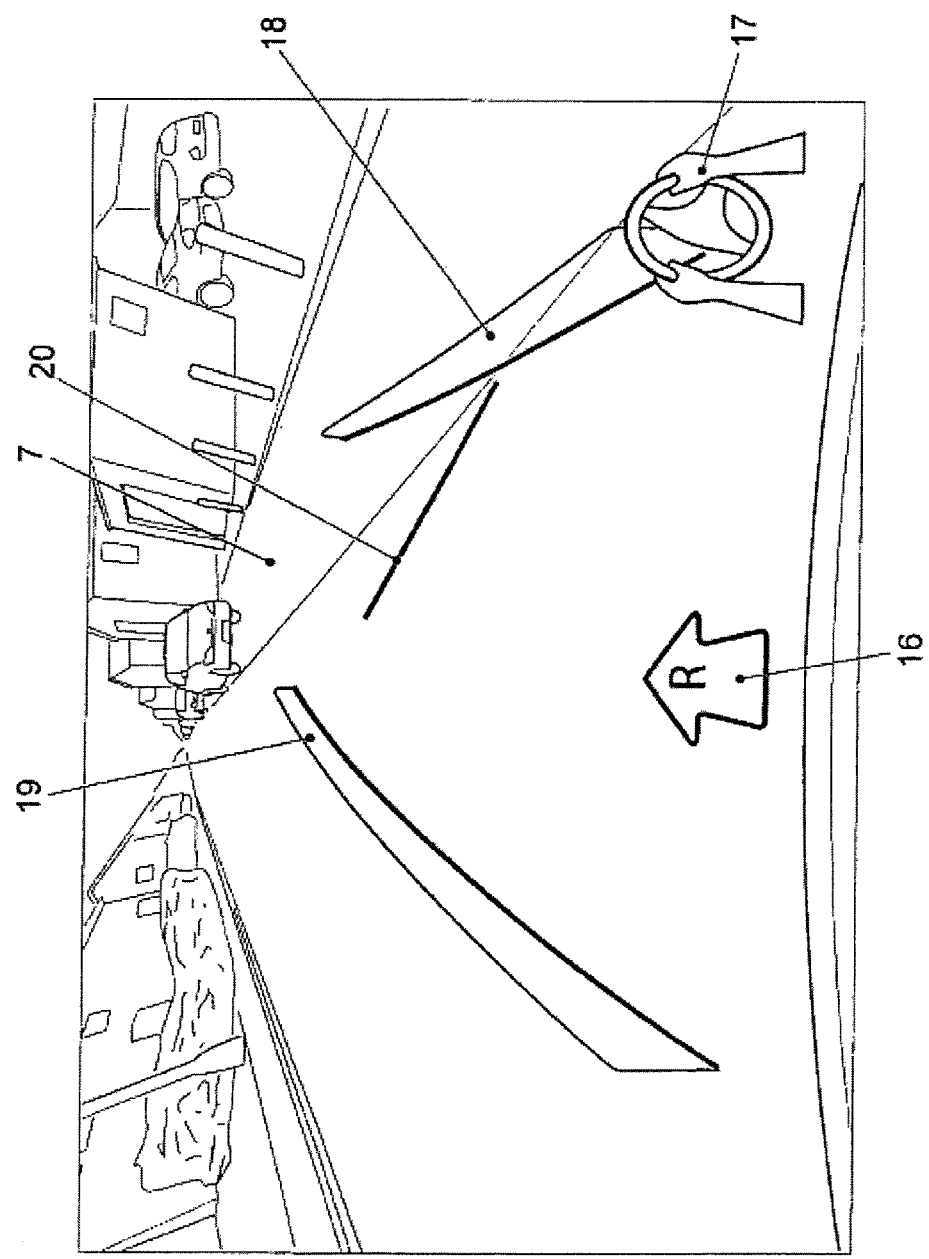
FIG. 6 shows an intermediate state during the parking in the parking space.

FIG. 6 shows an intermediate state during the first reverse parking section, which state is defined by the parking position and the deflection position in the longitudinal parking space 7. The driver of the vehicle to be parked has set the vehicle in motion according to the request by the driving symbol 16 and is requested by a further steering symbol 17 not to change the selected steering angle. This may be done, for example, by means of the steering symbol 17 shown, wherein the steering wheel which is held in two hands is intended to signal to the driver that the steering wheel should be held in the present position. Since the system knows the parking position and the end position, i.e. the deflection position, of the first reverse driving section, an estimation of the driving path and of the driving profile can be performed. A driving tube is determined on the basis of the actual driving profile and is displayed in the image of the area to the rear in the form of two second 3D objects, in this case transparent guide rails 18 and 19 in 3D form. In addition, an auxiliary line 20, which serves for the later orientation in the longitudinal parking space 7, is also blended in. A setpoint driving path, which is then displayed by means of an auxiliary line if the driving tube deviates from the setpoint path, is not shown.

Figure 7:
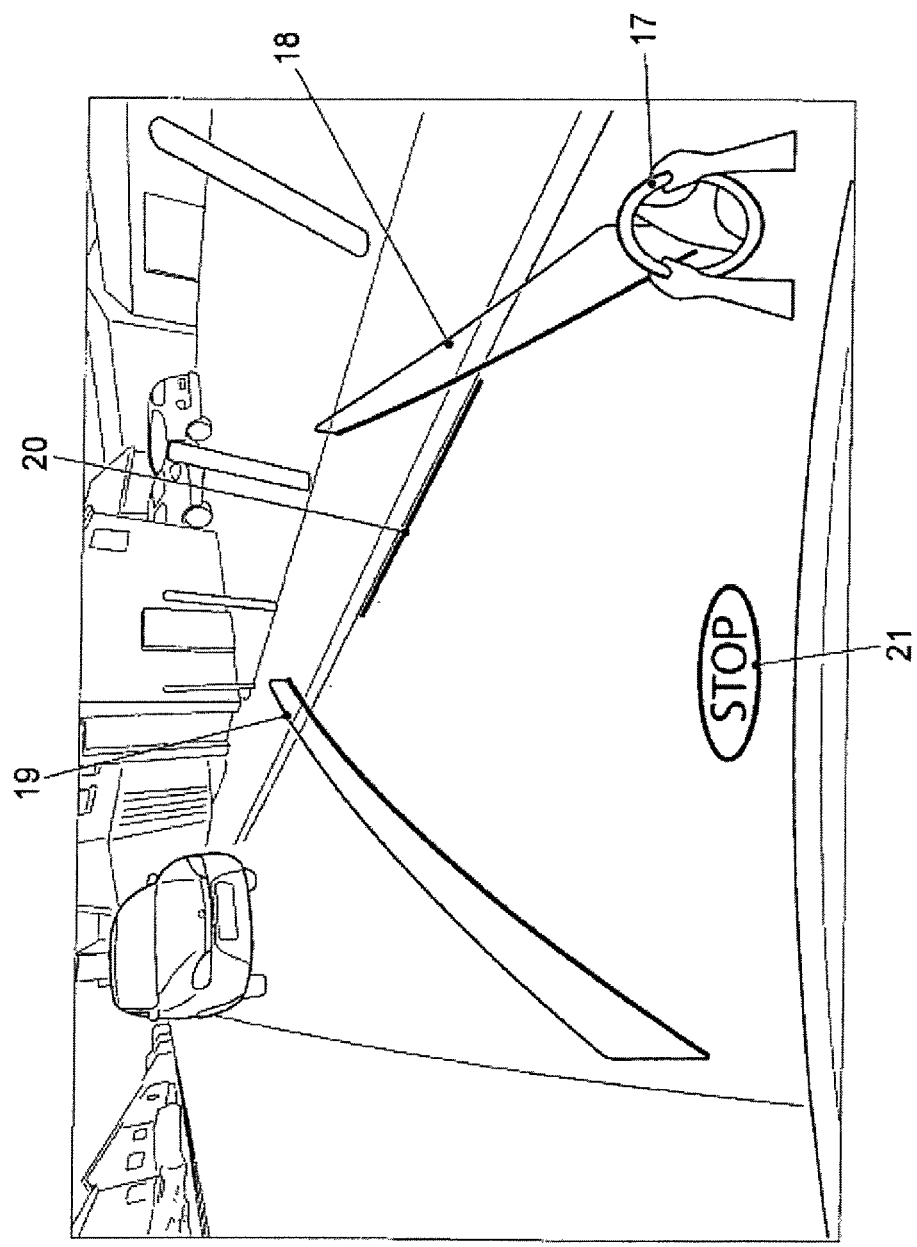
FIG. 7 shows the deflection point in the parking space being reached and the orientation of the auxiliary line.

FIG. 7 shows the deflection point being reached. Since the system has an estimate of the driving path and therefore knows the approximate deflection point, just before the estimated deflection point is reached or when it is reached the driver is requested, with a blended-in stop symbol 21, to stop the vehicle. Just before the estimated deflection point is reached means a predefined distance stored in the system. However, since the system estimate is imprecise and subject to errors, an auxiliary line 20, with which the driver is intended to orient the curb or the parking space longitudinal marking, is additionally blended in for the driver. If the auxiliary line is not yet oriented with the parking space boundary when the request to stop the vehicle occurs, the driver carries on driving, despite the request to stop, until the auxiliary line 20 has been oriented, and he then stops the vehicle. The driver therefore corrects the system estimate by means of the precise orientation of the additional auxiliary line by moving the steering wheel until the auxiliary line corresponds to the parking space boundary. The system then knows the deflection point and has an estimate of the end position with respect to the second driving section.

Figure 8:
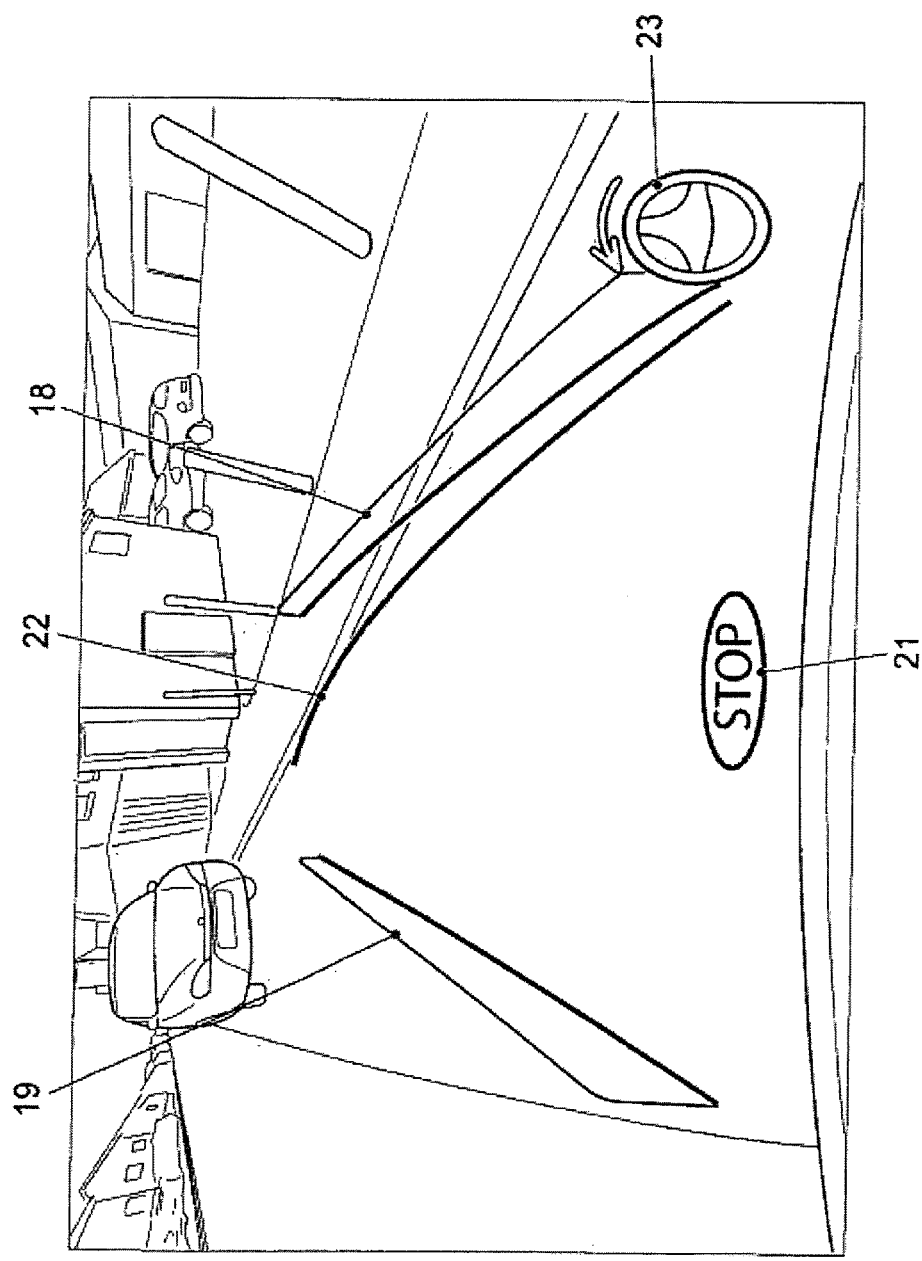
FIG. 8 shows a request to deflect at the deflection point.

FIG. 8 shows the selection of the new steering angle for the next driving section after the deflection point has been reached. After the driver has oriented the auxiliary line 20 with the parking space boundary in FIG. 7, he stops the vehicle, which, for the system, is the indication of the deflection point having been reached. Since the new steering angle for the second driving section is not yet defined, the stop symbol 21 remains displayed on the display. Owing to the orientation of the auxiliary line 20 in FIG. 7, the system is aware of the parking space boundary and a further auxiliary line 22, which predefines the setpoint driving path, is blended in, the driver having to orient the driver-side 3D guide rail 18 with the auxiliary line 22 by selecting a new setpoint steering angle. For this purpose, the driver is provided with a request to steer by means of a blended-in steering symbol 23 which indicates, by means of the direction arrow, the direction in which he has to turn the steering wheel. The driver-side 3D guide rail 18 is displaced toward the auxiliary line 22 by turning the steering wheel in this direction and by the resulting change in the steering angle which is set. If correspondence is brought about between the auxiliary line 22 and the driver-side 3D guide rail 18, the searched-for new setpoint steering angle is determined and an estimate is calculated as to how far the vehicle has to be moved back until it is correctly oriented.

Figure 9:
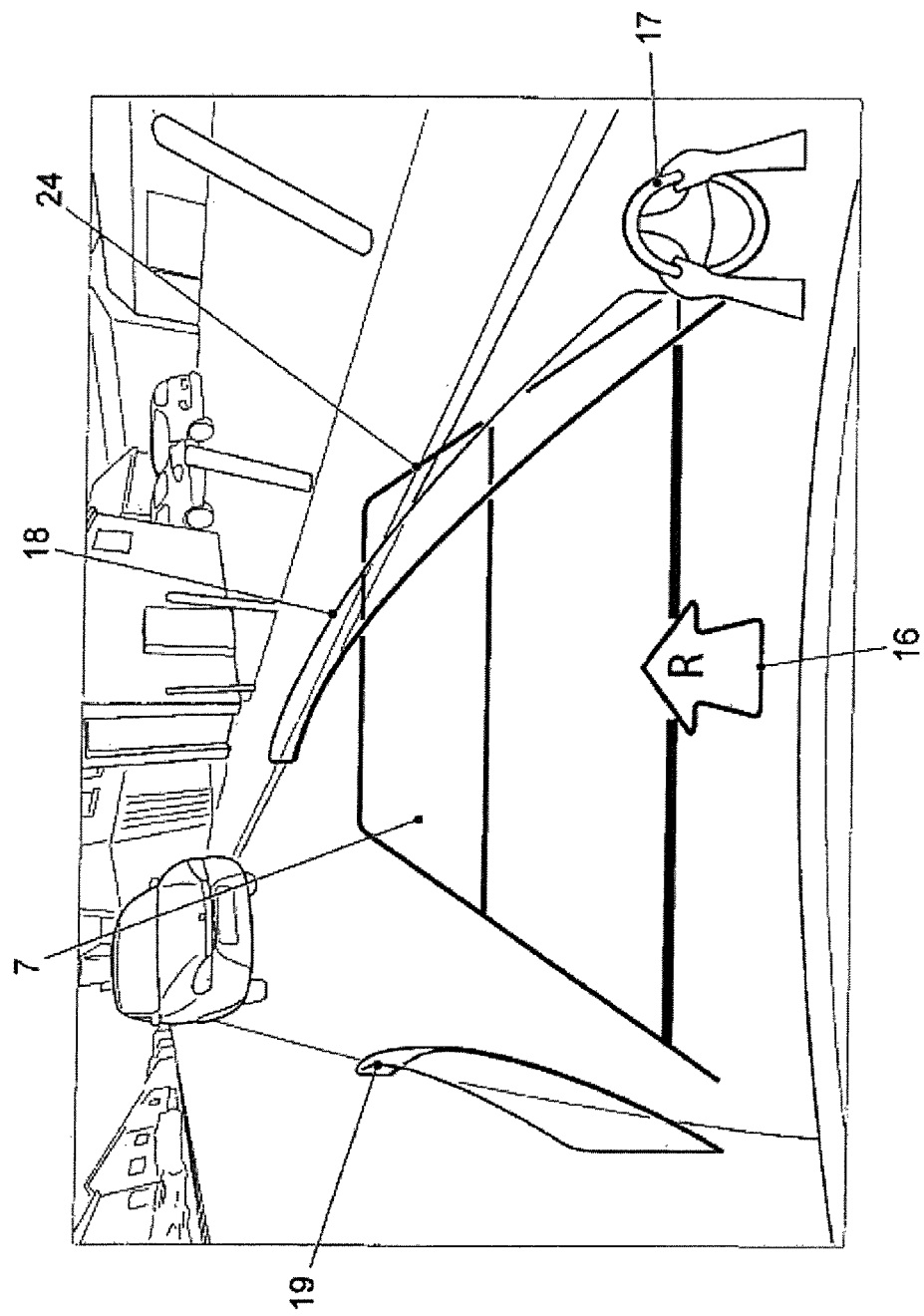
FIG. 9 shows the start of the reversing to the end point.

FIG. 9 shows the initiation of the next driving section. Since the setpoint steering angle which is necessary for further parking in the longitudinal parking space has been found, the driver is requested to drive on in the reverse direction by the blending in of the driving symbol 16, wherein the blending in of the steering symbol 17 requests the driver to maintain the steering angle which has been set. In addition, the driving tube based on the actual steering angle is displayed by blending in the transparent 3D guide rails 18, 19. The auxiliary line 22 of the setpoint driving path of the second driving section can no longer be seen since it is covered by the driver-side 3D guide rail. To correctly orient the vehicle in the longitudinal parking space 7, a distance grid 24, which is a function of the current location of the reverse movement, is additionally blended in.

Figure 10:
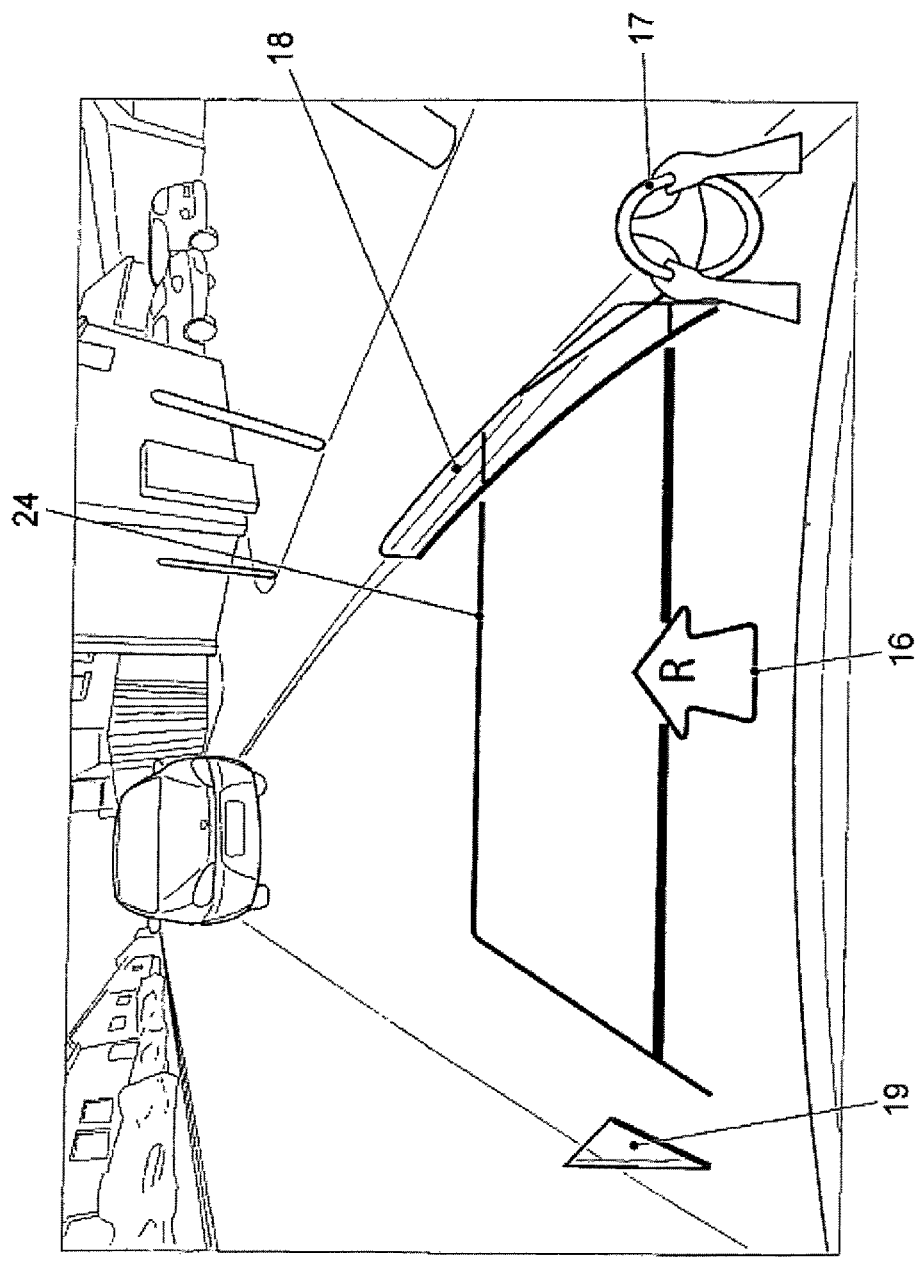
FIG. 10 shows an intermediate state during the further reversing.

FIG. 10 shows the situation just before the end position is reached. The distance grid 24 is already shortened. However, it is not yet oriented with the parking space boundary. The driver-side 3D guide rail 18 still points in the direction of the parking space boundary, with the result that the estimated end point is not yet reached. In addition, the driver is requested, by the steering symbol 17, to maintain the steering angle.

Figure 11:
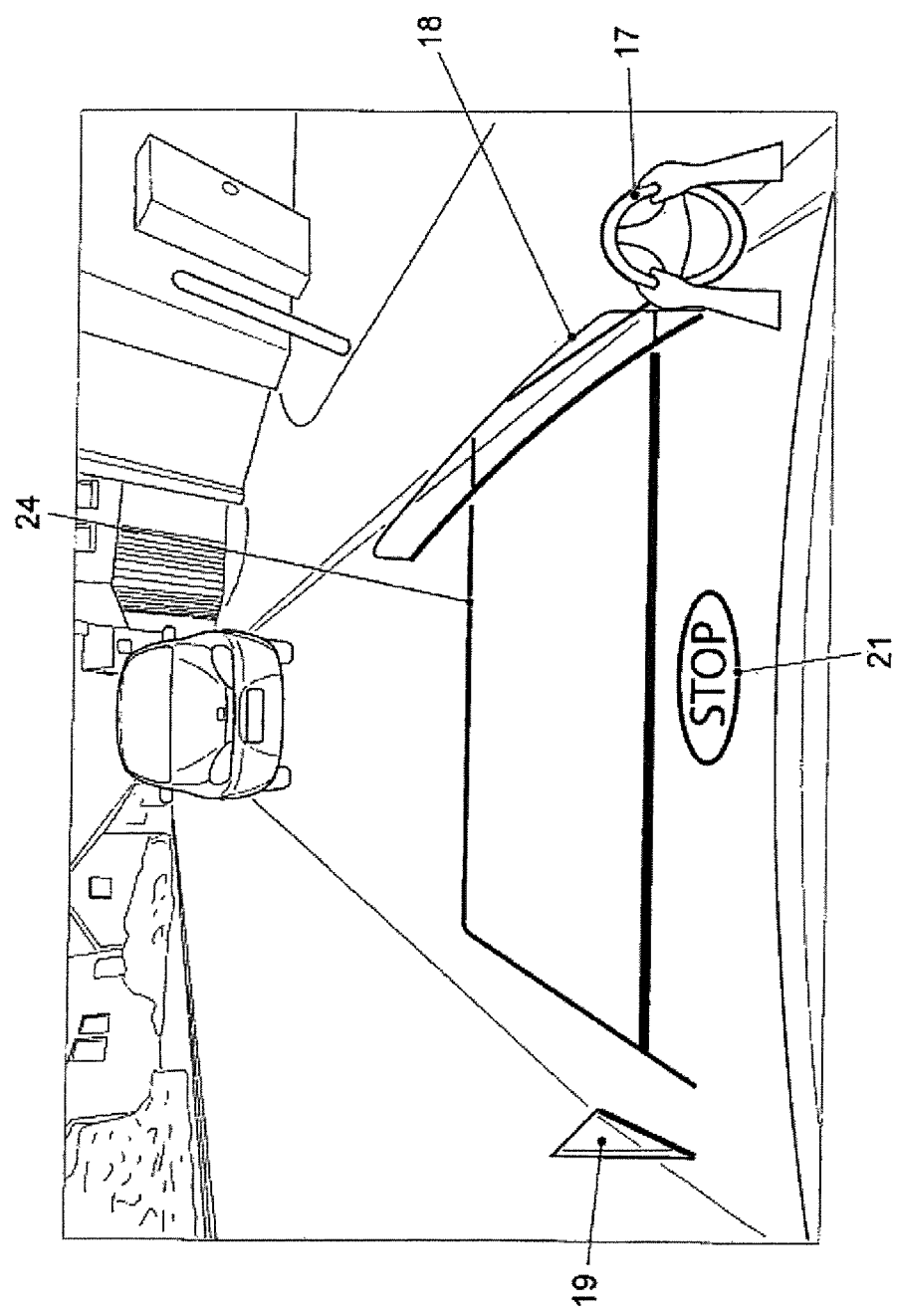
FIG. 11 shows the end position being reached with a request to stop.

FIG. 11 shows the reaching of the estimated end position at which the driver is requested, by the stop symbol, to stop the vehicle. The shortened distance grid 24 is oriented essentially with the parking space boundary, i.e. the curb. Essentially oriented means that the curb and the grid are located within a predetermined angle range, for example 10°. Since the end position is reached, the parking process can be considered to be ended, but the steerable front wheels are not straight, which is apparent from the profile of the 3D guide rails which run out of the parking space.

Figure 12:
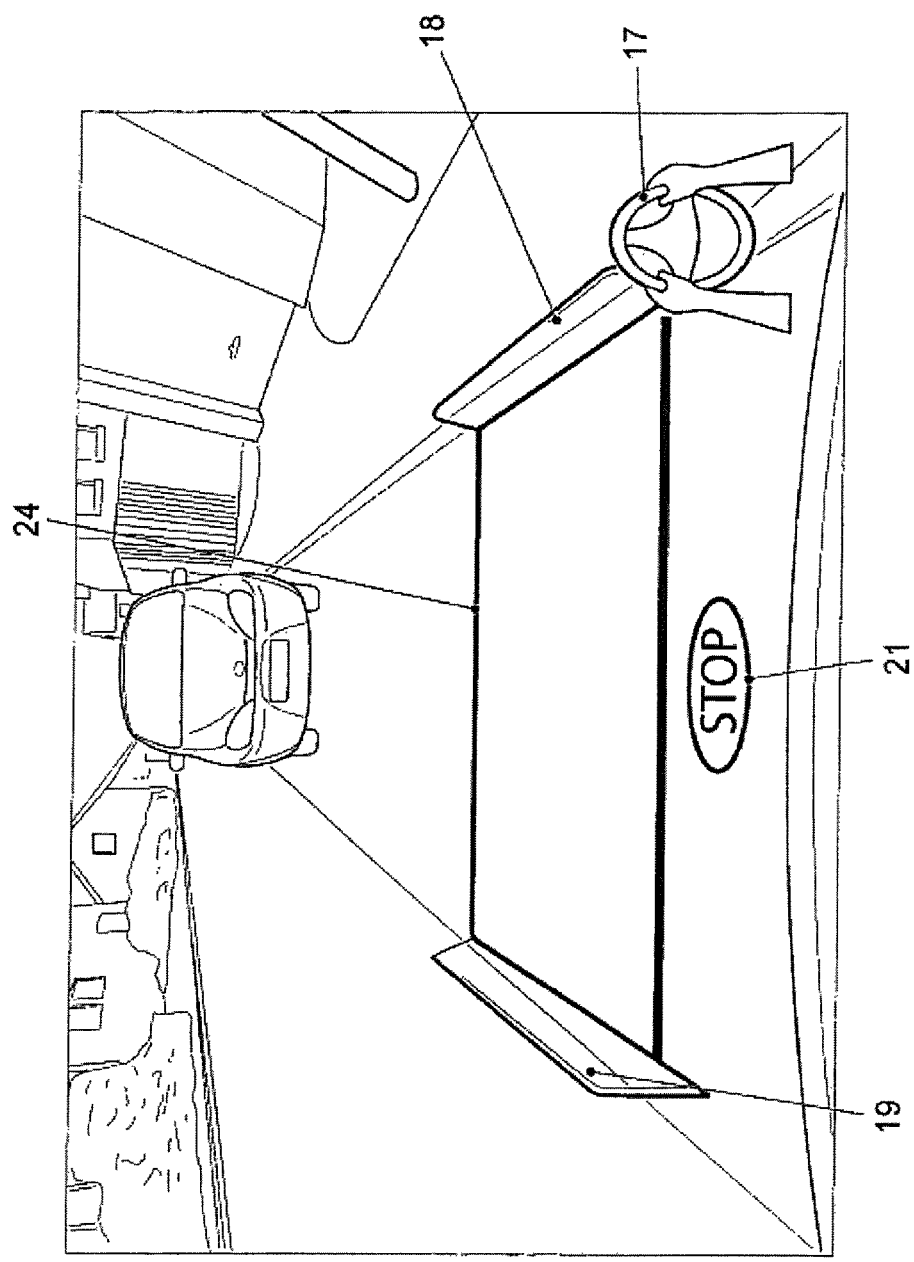
FIG. 12 shows the orientation of the vehicle over the content of the image.

FIG. 12 shows the orientation of the wheels. Turning the steering wheel causes the 3D guide rails to be made congruent with the distance grid, which means that now the vehicle is oriented in the parking space. Since this does not have any further consequences for the assisting parking system, the stop symbol 21 and the steering symbol 17 are blended in without modification in this disclosed embodiment.

To summarize, an image-displaying system with the possibility of superimposing auxiliary graphics and which assists the parking process in longitudinal parking spaces incrementally but without image-evaluating methods. In this context, different parking steps are differentiated, specifically:

driving to the parking space,
turning the steering wheel to a necessary steering angle,
reversing as far as the deflection point and then stopping,
turning the steering wheel to the necessary steering angle after the deflection point, and
reversing as far as the end position to orient the vehicle.

The device is cost-effective since no information which requires a high computing power is acquired from the image content.

Auxiliary graphics are used to request the driver to bring about the initial state for the first parking step, i.e. positioning of the vehicle by means of the 3D cuboids and steering lock up to the parking space at the destination in the image.

From the vehicle state which is then achieved it is possible to determine how far the vehicle has to be moved back to arrive at the deflection point. The system therefore knows an estimate of the first driving path. The driver is requested to drive off and to drive on based on the estimate. Just before the deflection position is reached, a "stop" symbol is blended in. However, since the system estimate is imprecise and subject to errors, a line with which he is intended to orient the curb or the parking space longitudinal marking is additionally blended in for the driver. The driver therefore corrects the system estimate by precise orientation of the additional auxiliary line.

After the deflection, the system can again calculate an estimate as to how far the vehicle has to be moved back up to an end position until it is correctly oriented. The system therefore assists the driver again with the driving request and a stop estimate. By means of the image content and further auxiliary lines, the driver can and should correct the estimate error again by orienting the image content with the auxiliary lines.

A system which estimates the location for the ending of the next driving movement from the initial state of the driving movement and signals it back to the driver is provided without image recognition methods. In addition, the estimate error can be corrected by orienting the image content with respect to the suitable auxiliary lines. The end of the driving movement can be displayed by means of a stop symbol. The blending in of the auxiliary lines for the purpose of orientation can be carried out selectively at the estimated end of the driving movement. The interpretation of the auxiliary lines for the orientation of the vehicle, for example with a curb, is then very intuitive since the curb auxiliary line is already present in the vicinity of the curb as image content.

Figure 13:
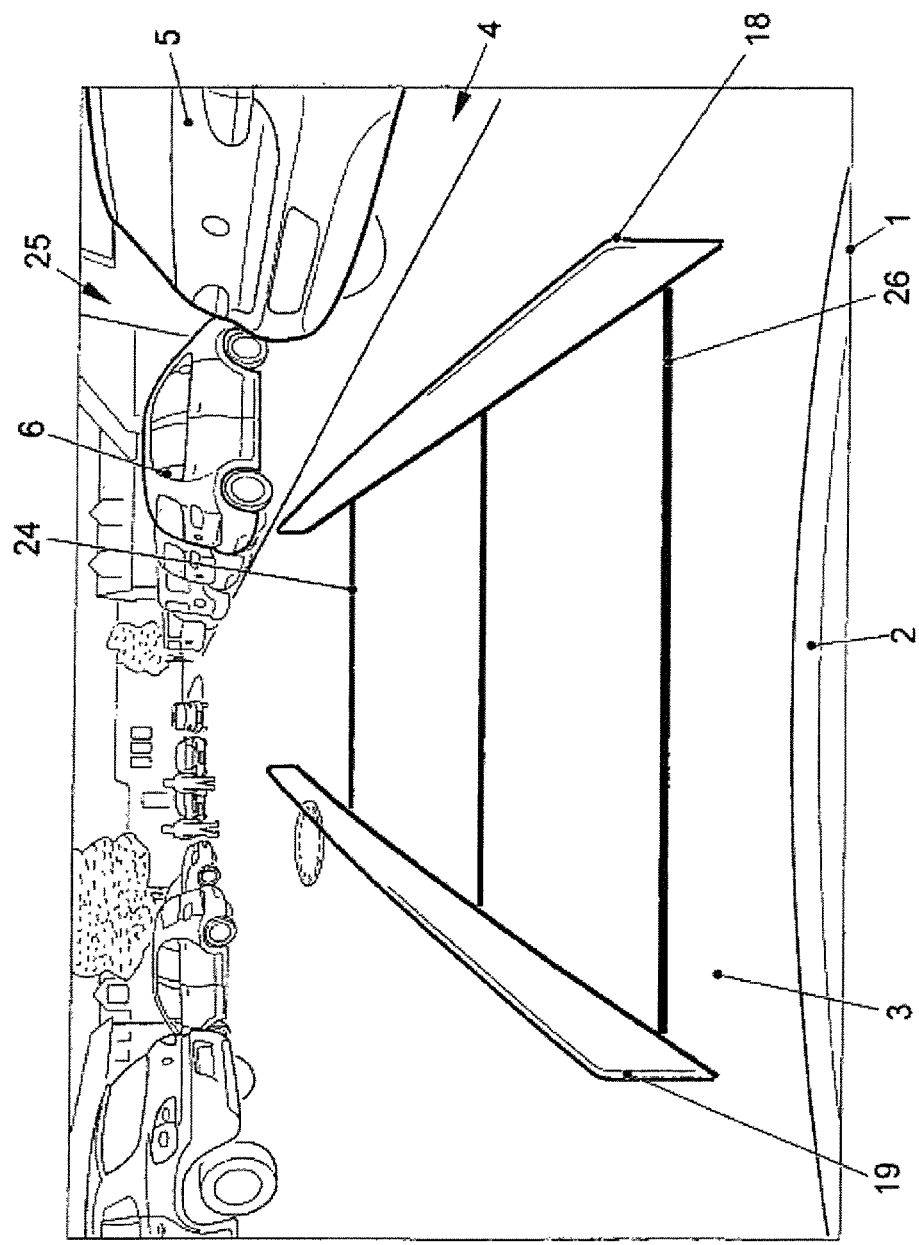
FIG. 13 shows the approaching of a lateral parking space with assistance.

FIG. 13 shows a typical situation of reverse parking into a lateral parking space. The image of a rear-view camera (not illustrated) can be seen on a display 1, wherein the rear end 2 of the vehicle to be parked is illustrated on the display 1 to give the driver a sensation of the actual conditions. The carriageway 3 can be seen in real time in the area to the rear of the vehicle, wherein a parking lane 4, on which a first vehicle 5 and a second vehicle 6 are located, is located on the driver's side. A lateral parking space 25 can be seen between the first and second vehicles 5, 6. To assist the driver during the parking process into the lateral parking space 25, two 3D objects, which bound the driving tube, here in the form of 3D guide rails 18, 19, are blended in a transparent fashion into the image of the real parking situation to the rear, wherein the 3D objects are coupled to the coordinate system of the vehicle. In this context, the driving tube which is determined by the 3D guide rails is a function of the vehicle and of the steering angle. In addition, the length of the 3D guide rails is predefined. To assist the driver further, further auxiliary lines are blended in in the form of a distance grid 24, wherein the line 26 of the distance grid 24 which is closest to the vehicle serves as a stop line, that is to say a line at which, the line being, for example, an obstacle, the vehicle has arrived at its end position.

Figure 14:
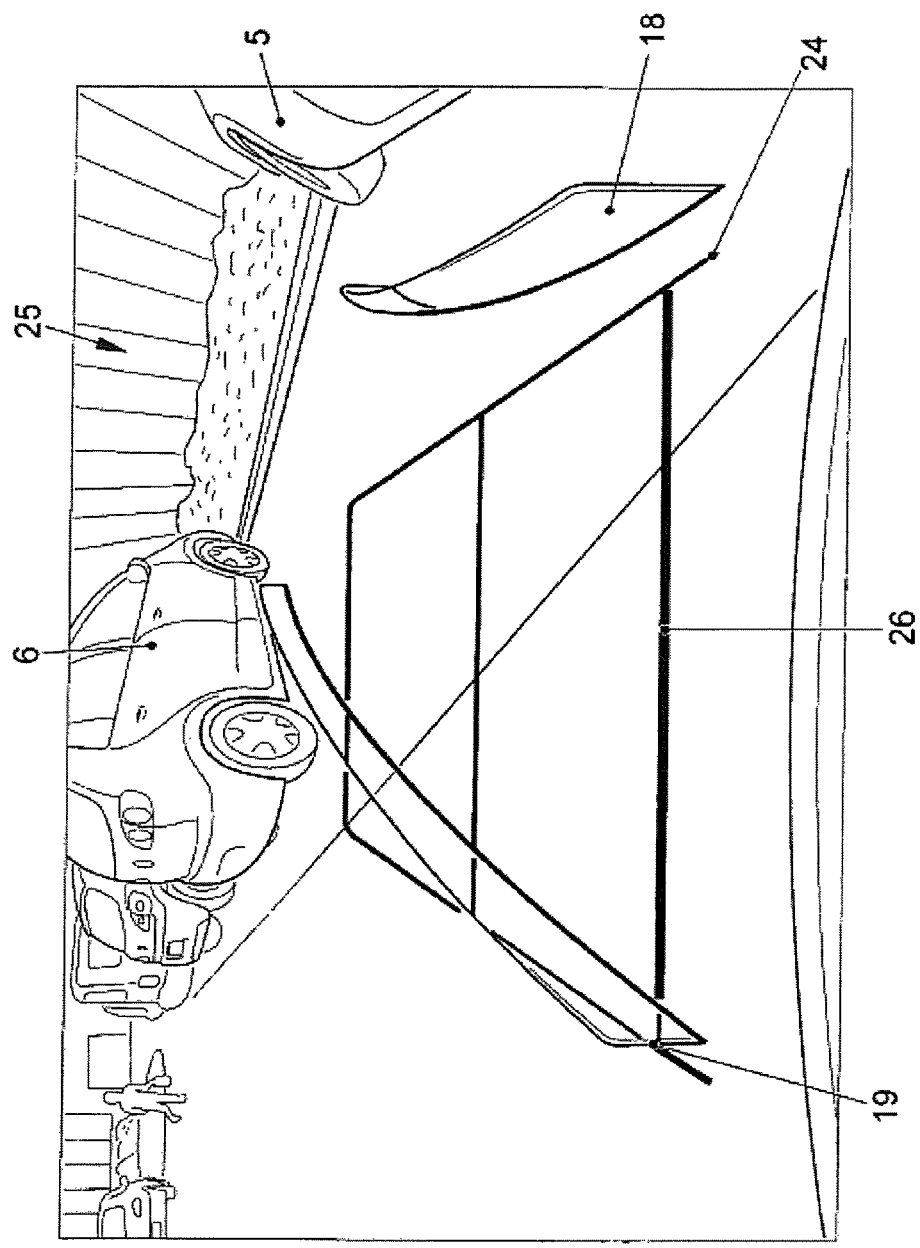
FIG. 14 shows the driving into the lateral parking space'

FIG. 14 shows the situation when the vehicle drives into the lateral parking space. For the driver it is clear, from the blending of the 3D guide rails 18, 19 into the image of the real lateral parking space, that the adopted steering angle leads into the lateral parking space 25 without there being the risk of a collision with the parked vehicles 5 and 6. The parking grid 24 does not follow the 3D guide rails 18, 19 since it is permanently connected to the vehicle coordinate system.

Figure 15:
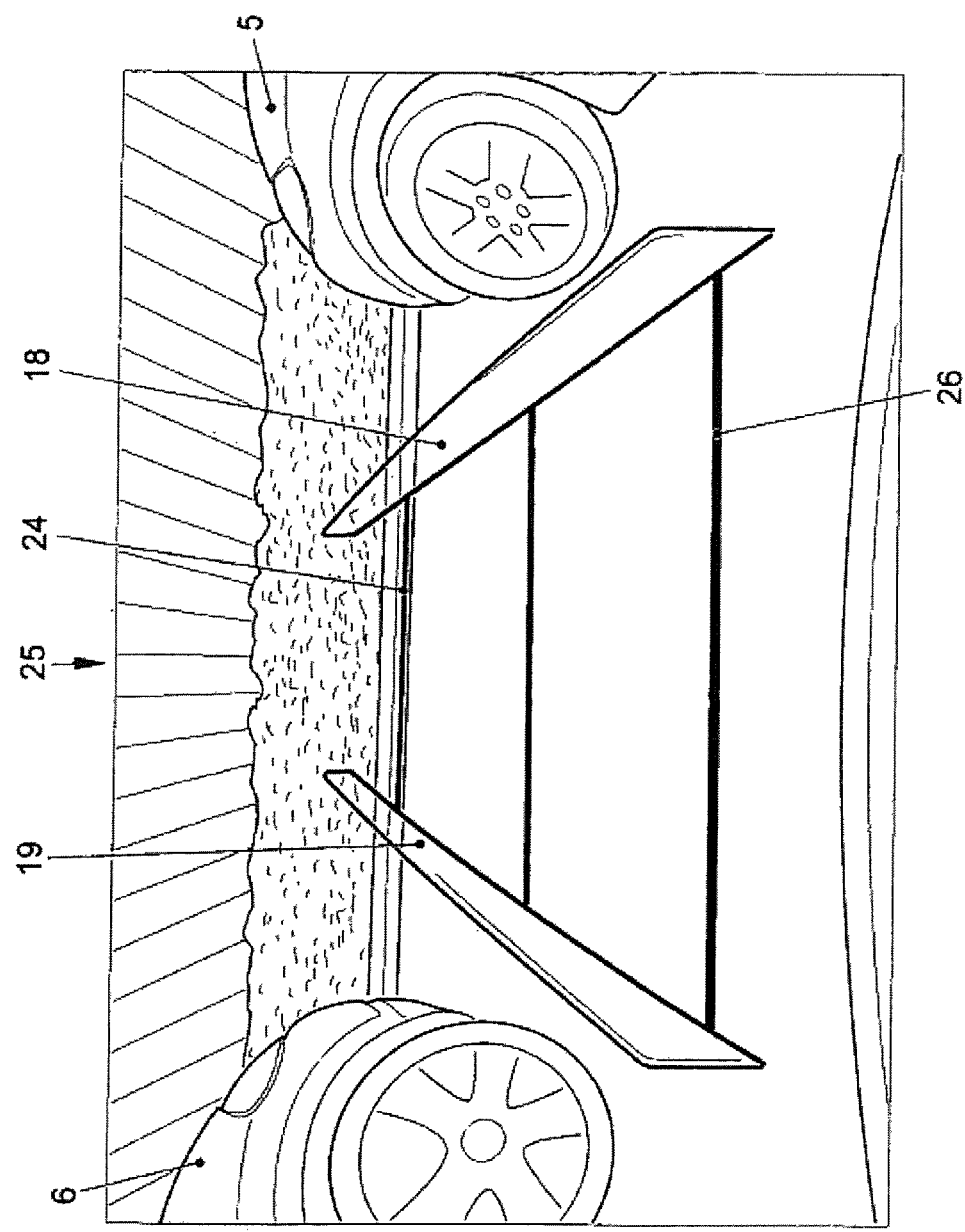
FIG. 15 shows the orientation of the distance grid in the lateral parking space.

FIG. 15 shows the situation after the vehicle to be parked has dipped into the lateral parking space. The blended-in 3D guide rails 18, 19 and the distance grid 24 indicate to the driver visually that the lateral parking space 25 is sufficiently large to park and orient the vehicle which is to be parked.

Figure 16:
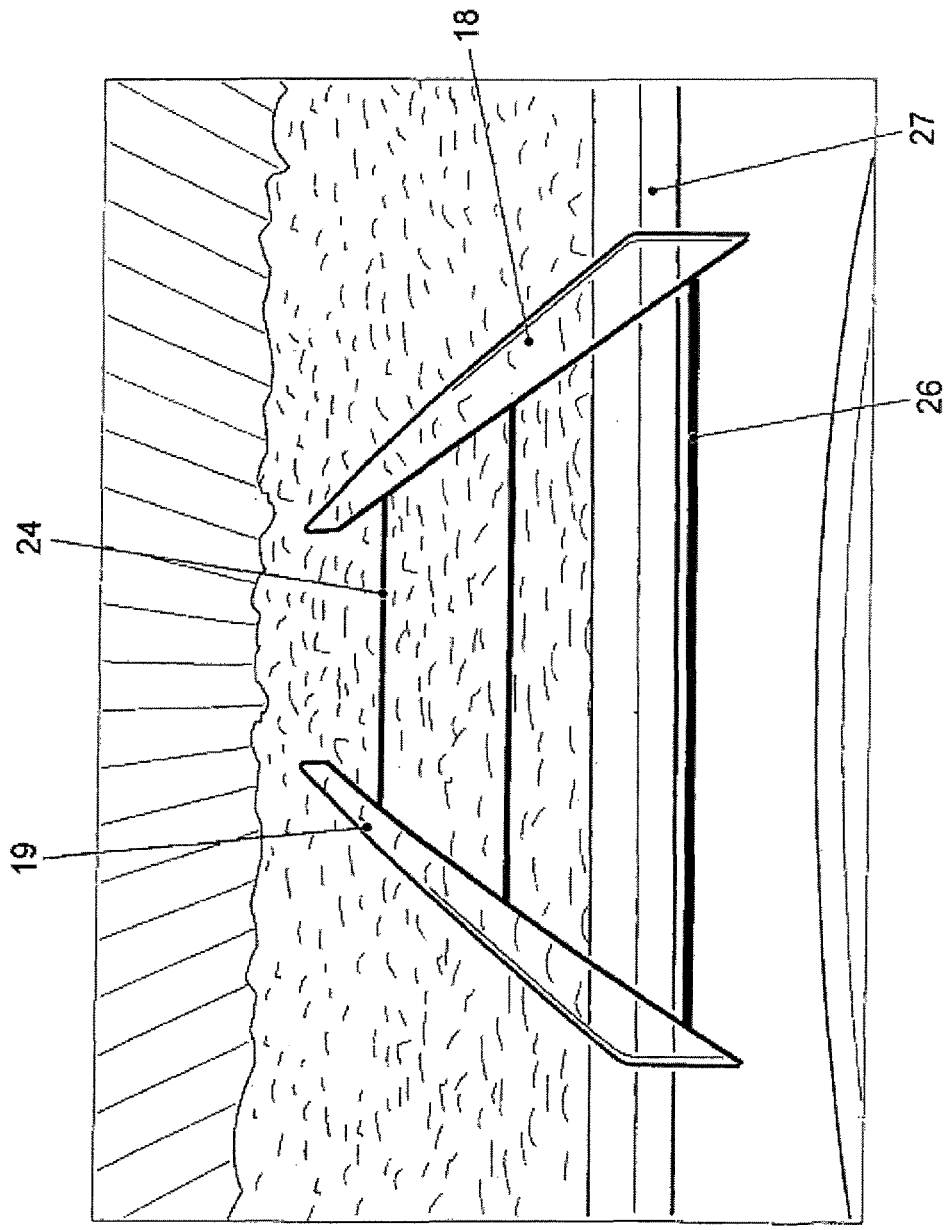
FIG. 16 shows the orientation of the vehicle at the lateral parking space boundary.

Finally, FIG. 16 shows the vehicle being oriented, by means of the stop line 26, with the curb 27 which defines the end of the lateral parking space 25.

To improve safety in road traffic and driving comfort, driver assistance systems have been increasingly used which assist the driver in his tasks and/or partially or completely perform certain driving functions. The best known examples of this are the ABS (anti-lock brake system) and ESP (electronic stability program). In addition, systems are known which assist the driver in parking a motor vehicle in a parking space or removing it therefrom, wherein in the simplest case a distance from obstacles is measured on the basis of ultrasound and a distance warning about the distance from obstacles is signaled to the driver, for example acoustically.

In the next expansion level, a graphic display of the surroundings of a motor vehicle taken by a suitable surroundings sensor system is offered to the driver instead of or in addition to the acoustic output. The graphic display of the surroundings of the motor vehicle makes it easier for the driver to perform a parking maneuver or de-parking maneuver.

In particular for a reverse parking maneuver, rear-view cameras are used here which, during reversing of a motor vehicle, monitor the surroundings to the rear of the vehicle and feed an image of the surroundings to a driver display with the result that the driver has available in real time a real image of the surroundings to the rear of his motor vehicle.

For example, the vehicle Lexus 460 of the model year 2007 is equipped with a parking guidance system (Advanced Parking Guidance System) which assists the driver during a parking process by displaying an image of the area to the rear of the vehicle as a reference for the reverse parking process into a longitudinal parking space on a display, wherein a control of the steering process is carried out when the vehicle is to be parked at a target position defined on the display. In this context, the system only performs the control of the steering angle; the monitoring of the reversing and the speed thereof are still the responsibility of the driver.

To initiate the parking process which is assisted by the parking guidance system, the driver must maneuver the motor vehicle in an initial position which is suitable for parking into a longitudinal parking space, wherein the system offers no help in finding the favorable position. After the reverse gear speed has been engaged and an activation button on the display has been touched, the parking guidance system is initialized and a parking frame in the possible parking space is displayed, wherein the driver can orientate the parking frame in the parking space by means of movement arrows displayed on the display. If the parking frame appears in the color "green", the parking guidance system can reach the parking frame, i.e. the parking frame is permissible. If the blended-in parking frame appears in the color "red", the parking frame cannot be reached from the selected initial position and the driver must drive to another initial position. To initiate the parking process in the green parking frame, the driver must confirm the selected parking frame and to do this activate a further button on the screen. Subsequently, the parking guidance system steers the vehicle into the parking space, wherein the driver regulates the speed. If the speed is too high, the system outputs a warning. If the driver then does not reduce the speed, the assistance is ended.

The known parking guidance system is also capable of parking in lateral parking spaces. However, in this case too, the selection of the initial position is not directly assisted but instead the system does not detect whether the lateral parking space is permissible until the driver attempts to position the parking frame in the possible parking space.

It is disadvantageous that the known parking guidance system is intuitive only to a small extent, wherein this applies, in particular, to the selection of the initial position. Excessively high complexity leads to system displays which do not correspond to the desired driving maneuver, as a result of which the driver is confused. The driving actions desired by the driver are unclear and the auxiliary graphics change surprisingly. It can be the case that the system state does not correspond to the driver's request, which happens, in particular, when the driver does not follow the ideal line but instead maneuvers to and fro repeatedly.

LIST OF REFERENCE NUMBERS

1 Display
2 Rear of vehicle
3 Carriageway
4 Parking lane
5 Front parked vehicle
6 Rear parked vehicle
7 Longitudinal parking space
8 Cuboid
9 Cuboid 10 Cuboid
11 Cuboid
12 Parking frame
13 Steering symbol
14 Steering symbol
15 Steering symbol
16 Driving symbol
17 Steering symbol
18 3D guide rail
19 3D guide rail
20 Auxiliary line
21 Stop symbol
22 Auxiliary line
23 Steering symbol
24 Distance grid
25 Lateral parking space
26 Stop line
27 Curb

The invention claimed is:

1. A method for assisting a driver to perform a reverse parking process of a motor vehicle equipped with an advanced parking guidance system into a longitudinal parking space, the method comprising:
generating an image of surroundings of the rear of the motor vehicle through a rear-view camera system, wherein the image of the surroundings of the rear of the motor vehicle is displayed on a display device in the motor vehicle and includes two first 3D symbols blended into the image displayed on the display device generated by the rear-view camera system, wherein positions of the two first 3D symbols in the image are based on the image generated by the rear-view camera system, wherein a distance between the two first 3D symbols corresponds to a minimum parking space for the motor vehicle; and
receiving selection of one side for the parking process, wherein the selection of the one side causes the first 3D symbols of the other side of the vehicle to be faded out of the image displayed on the display device.

2. The method of claim 1, wherein, in order to determine an initial position, the motor vehicle is moved by the driver until a gap between the first 3D symbols corresponds to the longitudinal parking space.

3. The method of claim 2, wherein, after the determination of the initial position of the motor vehicle, a parking frame is displayed on the display so as to be blended, through the use of the rear-view camera system, into the image of the area to the rear of the vehicle, wherein the displayed parking frame is displaced by orienting an inward steering angle until the displayed parking frame is oriented in the longitudinal parking space, as a result of which a deflection point is defined in the displayed parking frame.

4. The method of claim 3, wherein, after the orientation of the parking frame in the longitudinal parking space, rearward travel is carried out with the selected inward steering angle from the initial position to the deflection point arranged in the parking frame, wherein an actual driving tube is displayed in the image of the area to the rear of the vehicle by two blended-in second 3D symbols.

5. The method of claim 4, wherein a setpoint driving path which is defined by the selected setpoint inward steering angle is displayed in the image of the area to the rear of the vehicle by an auxiliary line.

6. The method of claim 4, wherein the vehicle is requested to stop within a predefined area surrounding the deflection point through at least one of an acoustic signal or stop sign displayed on the display device, and an auxiliary line displayed on the display device is made to be congruent by the driver with a longitudinal parking space boundary in order to determine an end position.

7. The method of claim 6, wherein, in the image of the area to the rear of the vehicle, an auxiliary line which defines the end point of the following vehicle movement is blended, through the use of the rear-view camera system, into the image of the area to the rear of the vehicle, wherein the driving tube which is displayed by the blended-in second 3D symbols is made to correspond through the advanced parking guidance system to the auxiliary line by selecting a new steering angle.

8. The method of claim 4, wherein, in order to assist the driver, further auxiliary lines are blended, through the use of the rear-view camera system, into the image of the area to the rear of the vehicle.

9. A device for carrying out a method for assisting a driver to perform parking of a motor vehicle in a longitudinal parking space, the device comprising:
a rear-view camera system to generate an image of the surroundings to the rear of the motor vehicle; and
a display for displaying the image of the surroundings to the rear of the motor vehicle taken by the rear-view camera system,
wherein the image includes two first 3D symbols blended into the image displayed on the display for displaying in order to assist the driver to determine the parking position, wherein the positions of the two first 3D symbols in the image are based on the image generated by the rear-view camera system, wherein on each side of the vehicle the two first 3D symbols are displayed, wherein a distance between the symbols corresponds to a minimum parking space for the motor vehicle,
wherein in response to receipt of a selection of one side for the parking process the first 3D symbols of the other side of the vehicle are faded out of the image displayed on the display device.

10. The device of claim 9, wherein the image includes a parking frame blended into the image, wherein, in the identified parking position of the motor vehicle, the parking frame in the image is displaced into the identified longitudinal parking space as a function of a steering angle, as a result of which a deflection point is defined in a displaced parking frame.

11. The device of claim 10, wherein the image includes two second 3D symbols blended into the image, wherein the two second 3D symbols display the driving tube of the motor vehicle during the parking process.

12. The device of claim 11, wherein the image includes further auxiliary lines blended into the image to assist the driver during the parking process.

13. The device of claim 9, wherein the device has an estimating unit that is a part of the rear-view camera system for estimating a driving path expected to be travelled along.

14. The method of claim 1, wherein the two first 3D symbols are 3D cuboids.

15. The device of claim 9, wherein the two first 3D symbols are 3D cuboids.

16. The method of claim 4, wherein the two second 3D symbols are 3D guide rails.

17. The device of claim 11, wherein the second 3D symbols are 3D guide rails.

* * * * *